(12) United States Patent
Kohda

(10) Patent No.: US 6,761,241 B2
(45) Date of Patent: Jul. 13, 2004

(54) FRONT SUSPENSION FORK ASSEMBLY

(75) Inventor: Hideo Kohda, Shizuoka (JP)

(73) Assignee: Yamaha Hatsudoki Kabushiki Kaisha, Shizuoka-ken (JP)

(*) Notice: Subject to any disclaimer, the term of this patent is extended or adjusted under 35 U.S.C. 154(b) by 0 days.

(21) Appl. No.: 10/272,691

(22) Filed: Oct. 16, 2002

(65) Prior Publication Data

US 2003/0075897 A1 Apr. 24, 2003

(30) Foreign Application Priority Data

Oct. 19, 2001 (JP) ........................................ 2001-322087

(51) Int. Cl.[7] .............................................. B62K 11/00
(52) U.S. Cl. ........................ 180/219; 280/276; 280/277
(58) Field of Search ................................. 180/219, 220, 180/6.5; 280/274–277, 279, 288.3

(56) References Cited

U.S. PATENT DOCUMENTS

| | | | |
|---|---|---|---|
| 4,542,910 A | | 9/1985 | Watanabe |
| 5,238,259 A | * | 8/1993 | Wilson et al. ............... 280/276 |
| 5,350,185 A | * | 9/1994 | Robinson .................... 280/276 |
| 5,398,954 A | * | 3/1995 | Chonan ....................... 280/276 |
| 5,417,446 A | * | 5/1995 | Pileggi ........................ 280/276 |
| 5,769,442 A | * | 6/1998 | Robinson et al. ......... 280/281.1 |
| 6,049,982 A | * | 4/2000 | Tseng ......................... 29/897.2 |
| 6,123,353 A | * | 9/2000 | Bennett et al. ........... 280/281.1 |
| 6,155,370 A | * | 12/2000 | Iwai et al. .................. 180/222 |
| 6,270,104 B1 | * | 8/2001 | Nelson et al. ............ 280/281.1 |
| 6,336,647 B1 | * | 1/2002 | Iwai et al. .................. 280/276 |

FOREIGN PATENT DOCUMENTS

| | | |
|---|---|---|
| DE | 29 11 335 | 10/1980 |
| EP | 0 490 120 A2 | 6/1992 |
| FR | 2 758 787 | 7/1998 |
| GB | 597036 | 1/1948 |
| GB | 640590 | 7/1950 |
| JP | 06-156355 | 6/1994 |

* cited by examiner

Primary Examiner—Lesley D. Morris
Assistant Examiner—L. Lum
(74) Attorney, Agent, or Firm—Knobbe, Martens, Olson & Bear, LLP

(57) ABSTRACT

A front suspension fork assembly suitable for use with a scooter-type vehicle. The front fork assembly is rotatably supported by a frame of the scooter and supports a front wheel of the scooter on its lower end. Desirably, the front fork assembly includes right and left fork legs extending along opposing sides of the front wheel. Each fork leg includes an upper fork tube telescopically engaged with a lower fork tube. An interconnecting portion, or support bridge, extends between the left and right fork legs. A central portion of the support bridge is coupled to a steering tube of the scooter and an intermediate portion of the support bridge extends between the central portion and each upper fork tube. Desirably, the left and right upper fork tubes and the support bridge are monolithically formed. Preferably, an upper end portion of each fork leg extends to a height above the central portion of the support bridge. In addition, preferably, an upper surface of the intermediate portions of the support bridge are generally horizontal, or normal to an axis of the fork legs. In one arrangement, a spring and/or damping member are disposed within an internal space of the upper fork tube above the central portion of the support bridge.

22 Claims, 4 Drawing Sheets

FRONT SUSPENSION FORK ASSEMBLY

RELATED APPLICATIONS

This application is related to, and claims priority from, Japanese Patent Application No. 2001-322087, filed Oct. 19, 2001, the entirety of which is incorporated by reference herein.

BACKGROUND OF THE INVENTION

1. Field of the Invention

The present invention relates generally to vehicle suspension systems. More particularly, the present invention relates to a front suspension fork assembly especially well-suited for use in connection with a straddle-type vehicle.

2. Description of the Related Art

Many types of vehicles utilize one or more suspension assemblies operably positioned between one or more wheels of the vehicle and the body of the vehicle. The suspension assemblies improve operator control by absorbing bumps, or other irregularities, in the surface that the vehicle is traversing. Straddle-type vehicles, such as motorcycles or motor scooters, for example, and other types of vehicles employing a single front wheel often use a telescopic front fork suspension assembly to absorb bumps encountered by the front wheel.

Such suspension fork assemblies typically include a pair of fork legs arranged on opposing sides of the front wheel. Each fork leg includes an upper fork tube telescopically engaged with a lower fork tube. A separately formed bracket member interconnects an upper end of the fork legs and is coupled to a steering assembly of the vehicle. The front wheel of the vehicle is usually supported by a lower end of the fork legs. Impact forces are imparted on the front wheel as the vehicle encounters bumps, or other irregularities, of the surface on which it is traversing. These forces are transferred to the junction of the bracket member and the upper fork tubes. Therefore, high strength in this area of the fork assembly is important.

In a typical prior art suspension fork assembly, the upper fork tubes and interconnecting bracket are an assembly of individual members. For instance, the upper fork tubes are often clamped or press fit into receiving apertures of the interconnecting bracket. Such a construction necessitates an additional manufacturing step to assemble the upper fork tubes to the interconnecting bracket and, thus, increases over all manufacturing costs of the vehicle. Furthermore, the upper ends of the upper fork tubes are usually supported at a height below an upper surface of the central portion of the interconnecting bracket. Thus, the bracket usually extends in a downward direction from the central portion to each fork leg. As a result, the potential cross-sectional contact area between the interconnecting bracket and each upper fork tube is necessarily limited. Thus, the overall strength of the fork assembly is also limited.

SUMMARY OF THE INVENTION

Advantageously, preferred embodiments of the present suspension fork assembly include upper fork tubes and an inner connecting portion, or support bridge, which are of a one-piece construction. Such an integrated arrangement permits cost-effective manufacture of the suspension assembly. In addition, desirably, an upper end of each upper fork tube extends above an upper surface of the central portion of the interconnecting portion, or support bridge. Accordingly, the support bridge may extend substantially horizontally from its central portion to each upper fork tube, thereby increasing the cross-sectional contact area between the support bridge and the upper fork tubes. Advantageously, with such an arrangement, the strength of the fork assembly is increased.

In a modification of the above-described preferred suspension fork assembly, a biasing member is positioned within the upper fork tube and is arranged to bias the upper fork tube and lower fork tube apart from one another. Preferably, at least a portion of the biasing member occupies a space defined by the upper end portion of the upper fork tube, which extends above the upper surface of the support bridge. Accordingly, such a suspension fork arrangement may possess a lower overall height while providing the same amount of suspension travel as a conventional suspension fork assembly, wherein the upper tubes do not extend above the interconnecting bracket.

An aspect of the present invention involves a front suspension fork assembly for a vehicle. The suspension fork is configured for attachment to a steering tube of the vehicle at an upper end and for supporting a front wheel of the vehicle at a lower end. The suspension fork comprises a pair of fork legs, each fork leg including an upper fork tube and a lower fork tube. The upper fork tubes are telescopingly engaged with the lower fork tubes. A support bridge interconnects the upper fork tubes and the support bridge and the upper fork tubes are monolithically formed. A central portion of the support bridge surrounds the steering tube and an upper end portion of each upper fork tube extends to a height above a height of the central portion of the support bridge.

Another aspect of the present invention involves a front suspension fork assembly for a vehicle. The suspension fork is configured for attachment to a steering tube of the vehicle at an upper end and for supporting a front wheel of the vehicle at a lower end. The suspension fork comprises a pair of fork legs, each fork leg including an upper fork tube and a lower fork tube. The upper fork tubes are telescopingly engaged with the lower fork tubes and a support bridge interconnects the upper fork tubes. The support bridge and the upper fork tubes are monolithically formed. The support bridge comprises a central portion surrounding the steering tube and an intermediate portion extending between the central portion and each upper fork tube. An upper surface of the intermediate portion is substantially normal to an axis of the fork tube.

A further aspect of the present invention involves a scooter having a front wheel, at least one rear wheel, and a frame. The frame comprises a head tube configured to rotatably support a steering tube. A front suspension fork assembly is attached to the steering tube at an upper end and supports a front wheel of the vehicle at a lower end. The suspension fork comprises a pair of fork legs, each fork leg including an upper fork tube and a lower fork tube, the upper fork tubes being telescopingly engaged with the lower fork tubes. A support bridge interconnects the upper fork tubes, the support bridge and the upper fork tubes being monolithically formed. A central portion of the support bridge surrounds the steering tube and an upper end portion of each upper fork tube extends to a height above a height of the central portion of the support bridge.

Yet another aspect of the present invention involves a scooter having a front wheel, at least one rear wheel, and a frame. The frame comprises a head tube configured to rotatably support a steering tube. A front suspension fork assembly is attached to the steering tube at an upper end and supports a front wheel of the vehicle at a lower end. The suspension fork includes a pair of fork legs, each fork leg including an upper fork tube and a lower fork tube. The upper fork tubes are telescopingly engaged with the lower fork tubes. A support bridge interconnects the upper fork tubes. The support bridge and the upper fork tubes are monolithically formed. The support bridge comprises a central portion surrounding the steering tube and an intermediate portion extending between the central portion and each upper fork tube. An upper surface of the intermediate portion is substantially normal to an axis of the fork tube.

BRIEF DESCRIPTION OF THE DRAWINGS

These and other features, aspects and advantages of the present suspension fork assembly are described in greater detail with reference to drawings of preferred embodiments, which are intended merely to illustrate, but not to limit, the present invention. The drawings comprise four figures.

DETAILED DESCRIPTION OF THE PREFERRED EMBODIMENT

Figure 1:
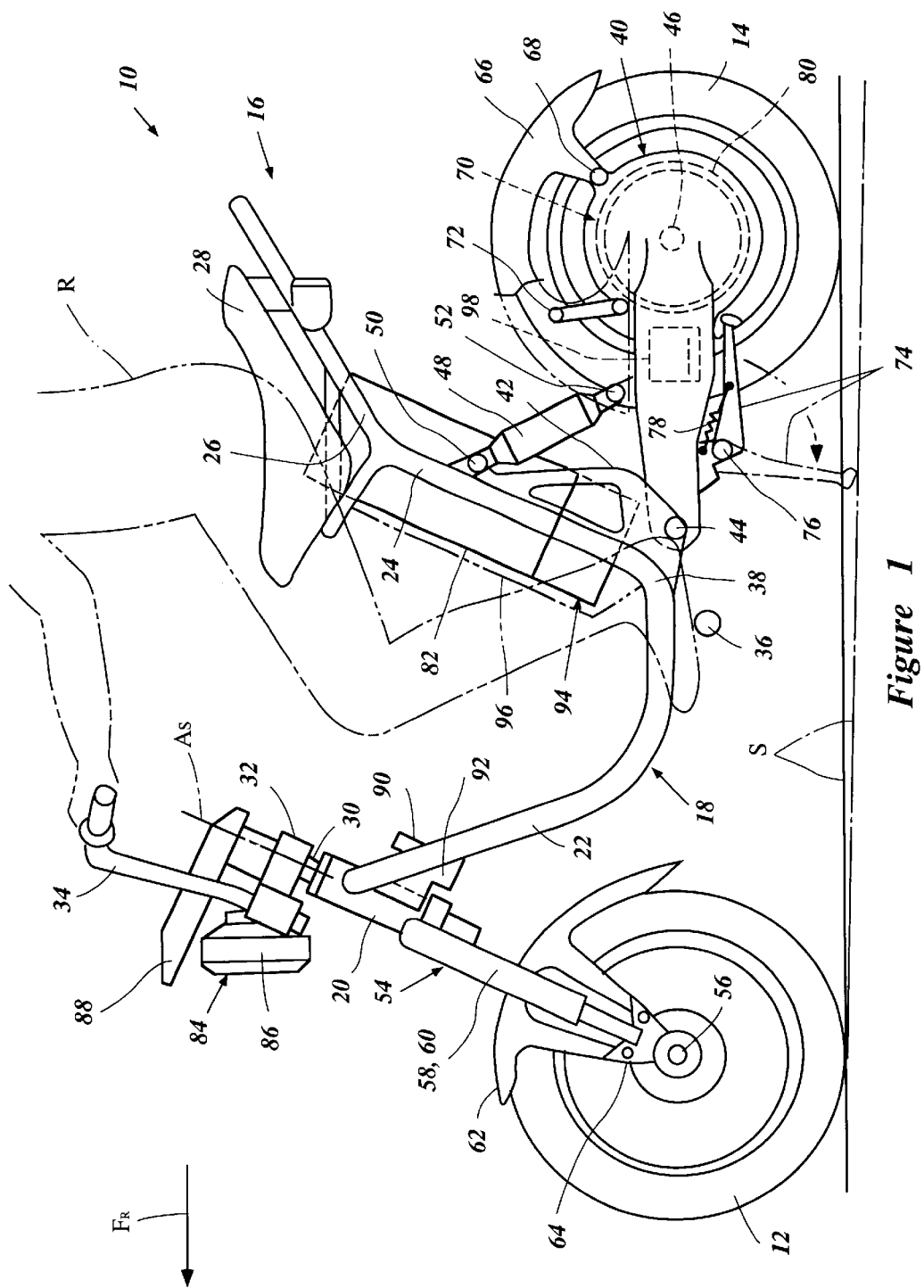
FIG. 1 is a side elevational view of a scooter-type vehicle employing a front suspension fork constructed in accordance with preferred embodiments of the present invention.

FIG. 1 illustrates a two-wheeled, straddle-type scooter vehicle, generally indicated by the reference numeral 10. Although the front suspension fork assembly of the present invention may be utilized on a wide variety of vehicles, such as motorcycles, three-wheeled vehicles and the like, the front suspension fork is described in the context of a scooter 10 herein. Accordingly, a preferred embodiment of a scooter 10 will be described in general detail to assist the reader's understanding of a preferred environment of use of the present suspension fork.

Figure 2:
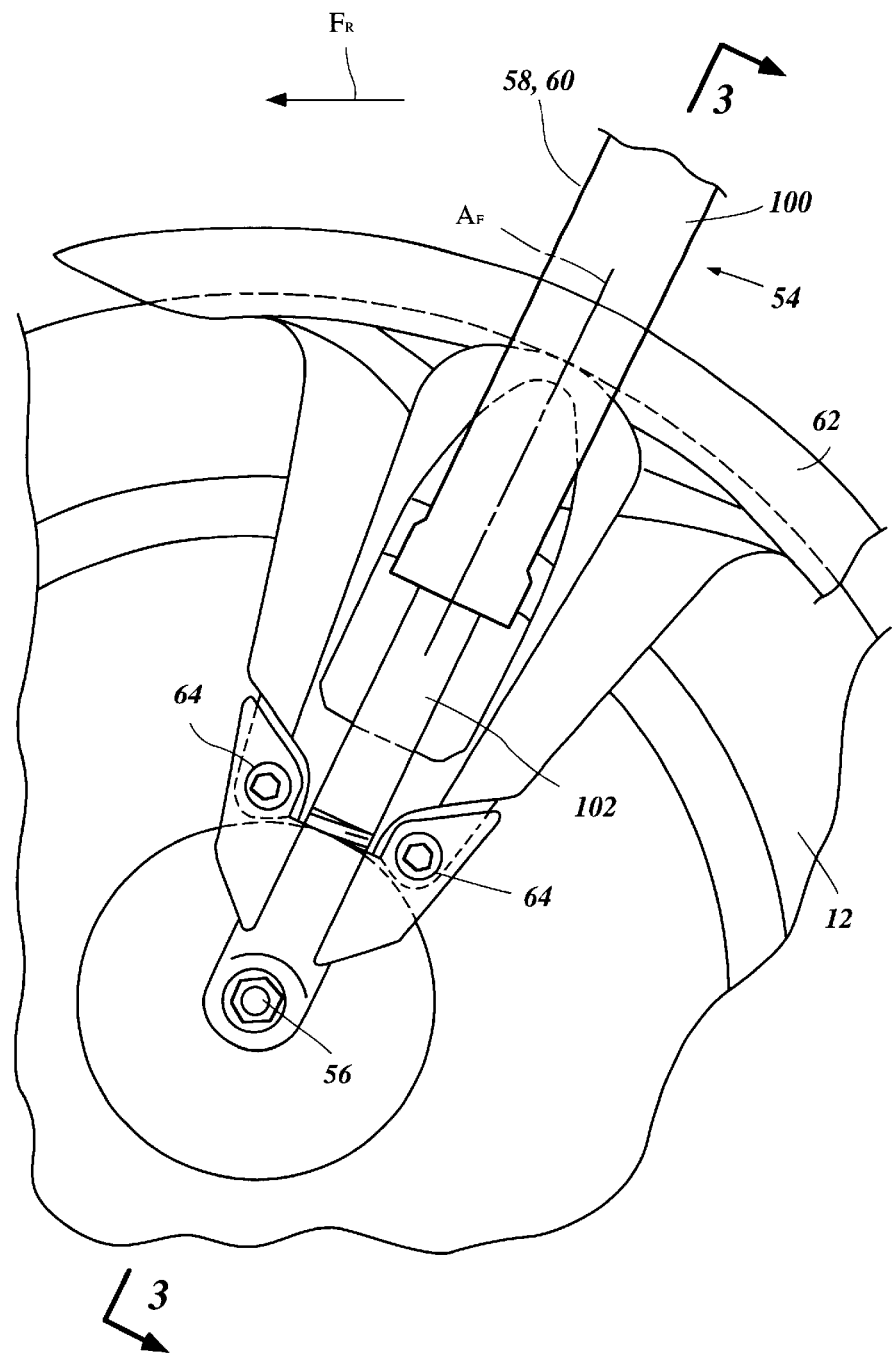
FIG. 2 is an enlarged view of the front suspension fork assembly and a portion of the front wheel of the scooter of FIG. 1.

The scooter 10 will be described with reference to a coordinate system wherein a central, longitudinal plane $C_P$ (FIG. 3) passes vertically through the center of the scooter 10. A lateral plane is vertically oriented and normal to the central plane $C_P$. Relative heights are expressed as elevations from a surface S (FIG. 1) upon which the scooter 10 rests. In FIGS. 1 and 2, an arrow $F_R$ indicates a direction of forward travel of the scooter 10. The terms "right" and "left" indicate right and left directions from the perspective of a person sitting in a normal position on the scooter 10.

The scooter 10 includes, generally, a front wheel 12, a rear wheel 14 and main body portion 16. Preferably, both front and rear suspension assemblies are interposed between the main body 16 and the front and rear wheels 12, 14, respectively. Thus, the front and rear wheels 12, 14 are permitted to move through a suspension travel path in relation to the main body 16 in order to absorb bumps, or other irregularities, in the surface S upon which the scooter 10 operates.

The body portion 16 of the scooter 10 includes a generally U-shaped, cradle-type frame 18, which provides a generally open central area to permit "step-through" mounting of the scooter 10. The frame 18 includes a head tube 20, which defines a steering axis $A_S$ of the scooter 10. Desirably, the steering axis $A_S$ is canted slightly rearward from the vertical direction, as is well known in the art. A pair of down tubes 22 (only one shown) extend in a rearward and downward direction from the head tube 20 on opposing sides of the central plane $C_P$. An intermediate portion of the down tubes 22 curve in a rearward direction, such that rearward end portions of the down tubes 22 are oriented generally horizontally (i.e., parallel surface S). A pair of seat stays 24 extend in an upward direction from rearward ends of the down tubes 22 and support an upper frame portion 26. A straddle-type seat assembly 28 is supported on the upper frame 26, on which a rider R of the scooter 10 may sit.

A steering tube 30 is rotatably supported within the head tube 20 of the frame 18. A handlebar support member, or stem 32, is connected to an upper end of the steering tube 30 and supports a handlebar assembly 34. The rider R may grasp the ends of the handlebar assembly 34 in order to steer the scooter 10. In addition, right and left foot supports 36 are positioned near a juncture 38 of the down tubes 22 and seat stays 24 to provide support for the feet of the rider R.

As described above, the front and rear wheels 12, 14 are supported relative to the main body 16 of the scooter 10 by front and rear suspension assemblies, respectively. Specifically, the rear wheel 14 is supported at rearward end of an arm member, or swing arm 40. A forward end of the swing arm 40 is connected to a bracket 42 which, in turn, is connected to the frame 18 of the scooter 10. Specifically, the bracket 42 supports a shaft 44 and the forward end of the swing arm 40 is rotatably supported by the shaft 44, as is well known in the art. Further, the rear wheel 14 is rotatably supported on a shaft 46 near a rearward end of the swing arm 40. Preferably, the swing arm 40 extends only along the left side of the rear wheel 14. That is, the swing arm 40 is of a single-sided construction.

A rear shock absorber 48 extends between the swing arm 40 and an upper portion of the bracket 42 to provide a force tending to resist upward movement of the rear wheel 14. Specifically, the shock absorber 48 is rotatably supported on a upper shaft 50, which is connected to the bracket 42, and is also pivotably supported by a lower shaft 52, which is connected to the swing arm 40. Desirably, the rear shock absorber 48 provides both a spring and damping force and may be of any suitable construction.

The front wheel 12 is supported relative to the main body 16 of the scooter 10 by a preferred embodiment of a front suspension fork assembly 54. An upper end of the front fork assembly 54 is connected to a lower end of the steering tube 30. A shaft 56 is supported on a lower end of the fork assembly 54 and rotatably supports the front wheel 12. Preferably, the front fork assembly 54 includes left and right fork legs 58, 60, respectively, which are situated on opposing sides of the front wheel 12.

Preferably, the scooter 10 also includes a front fender 62 covering an upper portion of the front wheel 12 and connected to a lower end of the front fork assembly 54 by one or more fasteners 64. Similarly, a rear fender 66 covers an upper portion of the rear wheel 14 and is connected to the swing arm 40 by one or more fasteners 68. The fasteners 64, 68 may be bolts or other suitable devices configured to secure the fenders 62, 66 to the front fork assembly 54 and the rear swing arm 40, respectively.

The scooter 10 may be equipped with a rear brake device 70, which is configured to exert a braking force on the rear wheel 14. The brake device 70 may be operated by the rider R through a hand control, or a foot control, actuator (not shown) interconnected with a brake control device 72. The brake 70 is desirably a drum-type brake assembly, which is well known in the art, but may be of any other suitable arrangement.

A lift-type center stand 74 is connected to a lower surface of the swing arm 40 for a pivotal movement about a shaft 76. Desirably, the center stand 74 includes left and right arms (only one shown) which are configured to, in a lowered position, raise the rear wheel 14 above the surface S upon which the scooter 10 is resting. Thus, the scooter 10 is supported by the front wheel 12 and stand 74 when the stand 74 is in the lowered position. The lowered position of the center stand 74 and the location of the surface S relative to the rear wheel 14 are illustrated in phantom. A spring 78, or other biasing member, secures the center stand 74 in a raised position when not in use.

Preferably, the scooter 10 includes a torque producing device drivingly connected to the rear wheel 14 to propel the scooter 10. In the illustrated embodiment, the torque producing device is an electric motor 80. However, other suitable devices may also be used, such as an internal combustion engine for example, but without limitation. Desirably, an output shaft of the electric motor 80 is drivingly coupled to the rear wheel 14 to impart rotational motion thereupon. A power supply 82, such as a battery, is electrically connected to the motor 80 and, optionally, to other auxiliary devices 84, such as a head light 86 and an instrument panel 88, for example. The instrument panel may include such information such as vehicle speed and battery level, among other information.

A main switch 90 is provided on a support 92, which extends in a rearward direction from the head tube 20 so as to be readily accessible to the rider R. The main switch 90 is configured to selectively connect or disconnect the battery 82 to the electric motor 80 and/or the electric accessories 84.

Desirably, the battery 82 is positioned below the seat assembly 28 and in between the left and right seat stays 24. A support 94 may be connected to the frame 18 and supports the battery 82. Preferably, a cover 96 covers at least a front portion of the battery 82 to protect it from damage and provide an aesthetically pleasing appearance. Desirably, the cover 96 instructed from a plastic material and is detachably connected to the seat stays 24.

A controller 98 is connected in series between the battery 82 and the electric motor 80 to control the amount of current delivered to the motor 80 and thereby control the output speed of the motor 80. Desirably, the controller 98 is operated by the rider R through a hand control, such as a rotating throttle grip assembly, or any other suitable mechanism.

Figure 3:
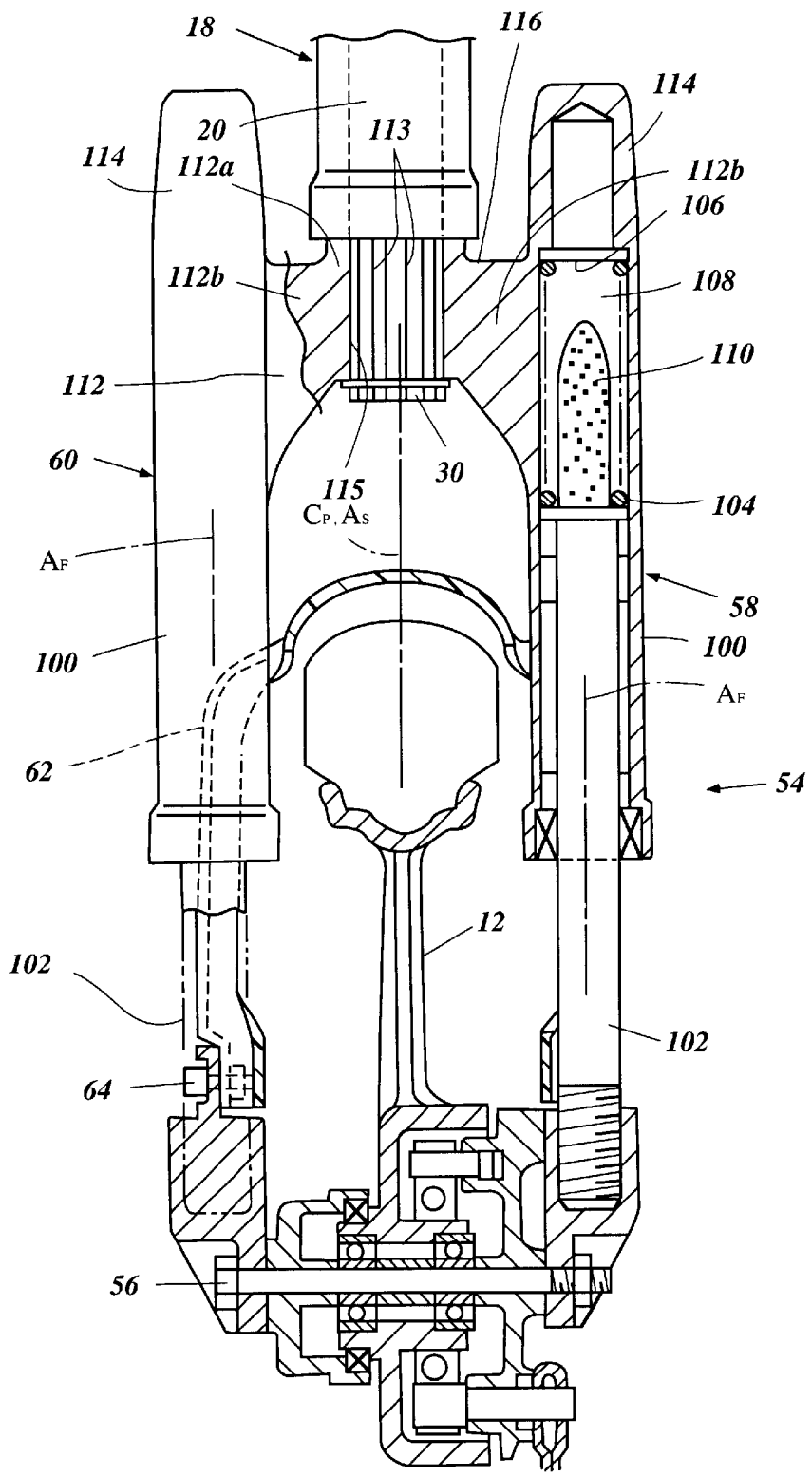
FIG. 3 is a partial cross-section, front view of the suspension fork assembly of FIG. 1, the cross-section being taken along the section line 3—3 of FIG. 2.

With reference to FIGS. 2 and 3, the front fork assembly 54 is described in greater detail. Each leg 58, 60 of the fork assembly 54 includes an upper fork tube 100 telescopically engaged with a lower fork tube 102. Desirably, the lower fork tube 102 is received within the upper fork tube 100. Thus, the upper and lower fork tubes 100, 102 are configured for relative, linear motion along a longitudinal axis $A_F$ of the fork legs 58, 60. Alternatively, this orientation may also be reversed wherein the upper tube 100 would be received within the lower tube 102.

With reference to FIG. 3, an upper portion of the left fork leg 58 is illustrated in section. Although not specifically shown, the internal components of the right fork leg 60 are desirably substantially identical to those of the left fork leg 58.

A biasing member, such as a spring 104, is provided within the left fork leg 58 and arranged to provide a force tending to bias the upper fork leg 100 and the lower fork leg 102 apart from one another. Specifically, the spring 104 is supported on an upper end of the lower fork tube 102 at a first end and a second end of the spring 104 abuts a plate 106 position within an upper portion of the upper fork leg 100. Thus, the spring 104 is disposed within a space 108 between the upper end of the lower fork tube 102 and a plate 106 and provides a force tending to bias the upper fork tube 100 upward relative to the lower fork tube 102. The spring 104 may be of any suitable type, such as a coil spring or elastomer spring, for example.

A cushioning member, or bumper 110, is supported by the upper end of the lower fork tube 102 and is configured to contact the plate 106 to attenuate a force transferred from the front wheel 12, via the lower fork legs 102, to the upper fork legs 100 and the rider R, via the handlebar assembly 34. The bumper 110 may comprise an elastomeric material which expands radially upon compression between the upper end of the lower fork tube 102 and the plate 106 to contact the spring 104 and provide damping to the relative movement of the upper and lower fork legs 100, 102, respectively. Although the illustrated arrangement is preferred, other types of spring and damping arrangements may be utilized.

An interconnecting portion, or support bridge 112, extends between, and interconnects, the left and right fork legs 58, 60. Desirably, the left and right upper fork tubes 100 and the support bridge 112 are monolithically formed. That is, the support bridge 112 and the upper fork tubes 100 of the left and right fork legs 58, 60 are comprised of a single piece of material. In a preferred arrangement, the support bridge 112 and the upper fork tubes 100 are constructed from a cast aluminum material. However, other suitable materials and manufacturing processes may also be used.

In the illustrated embodiment, a central portion 112a of the support bridge 112 surrounds, and is coupled to, the steering tube 30. The illustrated steering tube 30 includes external splines 113 sized and shaped to mate with internal splines (not shown) of an aperture 115 within the central portion 112a. However, other suitable arrangements for coupling the support bridge 112 to the steering tube 30 may also be used.

Preferably, an upper end portion 114 of each fork leg 58, 60 extends to a height above the central portion 112a of the support bridge 112. Intermediate portions 112b of the support bridge 112 extend laterally from each side of the central portion 112a and terminate in the upper fork tubes 100. Each of the intermediate portions 112b includes an upper surface 116, which, preferably is substantially normal to both the steering axis $A_S$ s and the axis $A_F$ of the fork legs 58, 60 (i.e., the upper surface 116 may be substantially horizontal). Such an arrangement is permitted due to the upper end portions 114 of the upper fork tubes 100 extending to a height above the central portion 112a of the support bridge 112. As a result, the cross-sectional contact area between the support bridge 112 and the upper fork tubes 100 is increased which, advantageously, increases the overall strength of the fork assembly 54.

Figure 4:
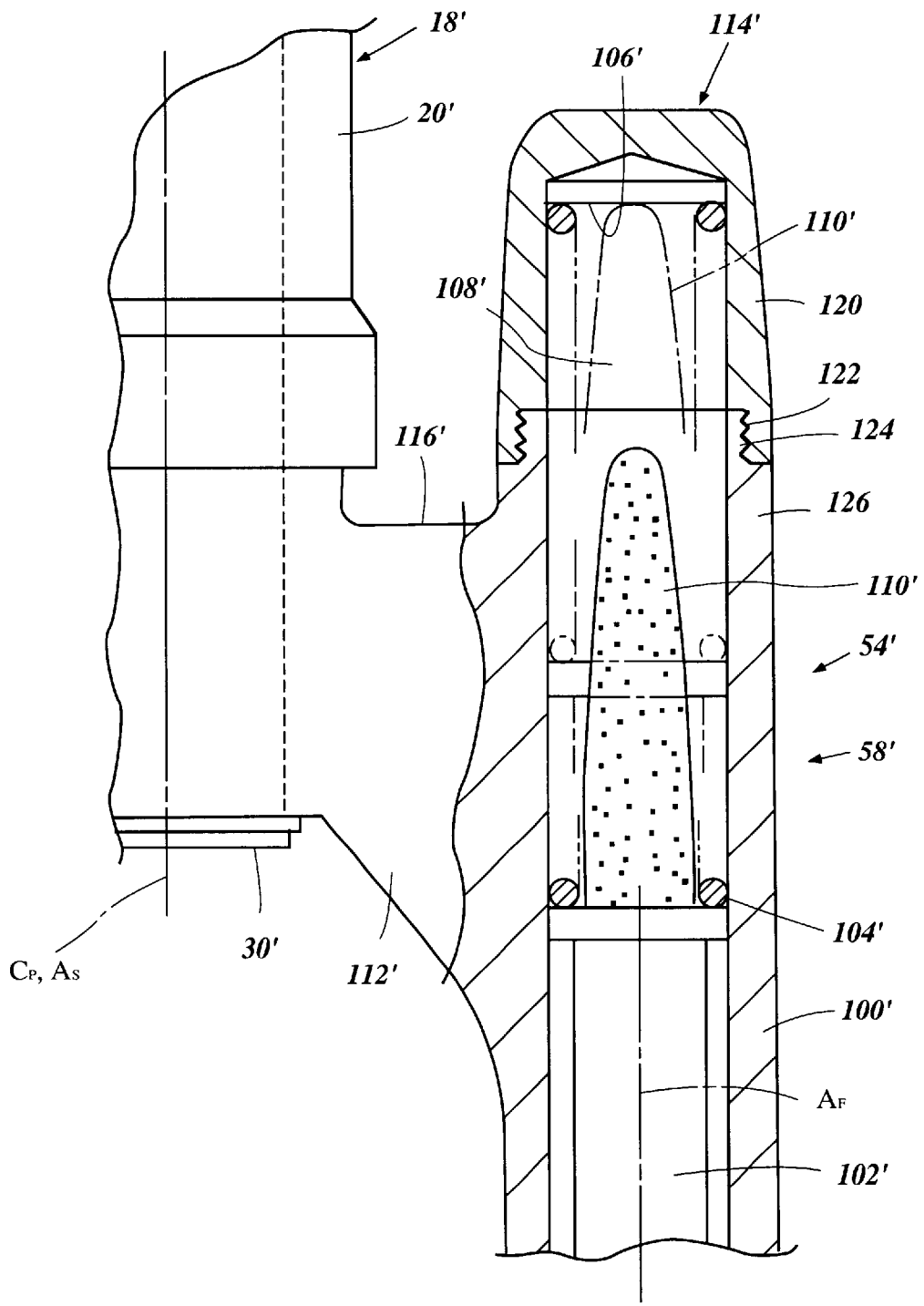
FIG. 4 is an enlarged, partial cross-sectional view of an upper left leg portion of a modification of the suspension fork assembly of FIG. 1.

FIG. 4 illustrates a modification of the front fork assembly 54 of FIGS. 1–3 and is generally referred to by the reference character 54'. The fork assembly 54' of FIG. 4 is substantially similar to the fork assembly 54 of FIGS. 1–3 and, therefore, like reference numerals denote like components, except that a prime "'" is added. Although not specifically illustrated, the right fork leg preferably is substantially identical to the left fork leg 54'.

The upper end portion of the left fork leg 58' comprises an end cap 120 having internal threads 122 which engage external threads 124 of a terminating end 126 of the upper fork tube 100'. In addition, the plate 106' is positioned at an upper end of the end cap 120 such that it is above the upper surface 116' of the support bridge 112'. Thus, an upper end of the spring 104' is located in the space 108' of the end cap 120, which is disposed above the upper surface 116'.

Furthermore, in a compressed position of the front fork 54', the bumper 110' is also disposed in the space 108'. Accordingly, with such an arrangement, the fork assembly 54' has a lower overall height while providing the same amount of suspension travel as a conventional front fork assembly wherein the upper ends of the fork legs do not extend beyond the upper surface of the interconnecting bracket. In addition, the cap 120 may be removed from the upper fork tube 100' to permit access to the spring 104' and the bumper 110'. Accordingly, the spring 104' and/or the bumper 110' may be easily replaced.

Although the present invention has been described in context of preferred embodiments, modifications apparent to those of skill in the art may be made without departing from the spirit and fair scope of the invention. Accordingly, the present invention should be defined only by the appended claims.

What is claimed is:

1. A front suspension fork assembly for a vehicle, the suspension fork configured for attachment to a steering tube of the vehicle at an upper end and for supporting a front wheel of the vehicle at a lower end, the suspension fork comprising a pair of fork legs, each fork leg including an upper fork tube and a lower fork tube, the upper fork tubes being telescopingly engaged with the lower fork tubes, a support bridge interconnecting the upper fork tubes, the support bridge and the upper fork tubes being monolithically formed, a central portion of the support bridge surrounding the steering tube, an upper end portion of each upper fork tube extending to a height above a height of the central portion of the support bridge.

2. The front suspension fork of claim 1, additionally comprising a biasing member within each fork leg, the biasing member being configured to produce a force tending to bias the upper fork tube and the lower fork tube apart from one another, at least a portion of the biasing member being disposed in a space defined by the upper end portion of the upper fork tube.

3. The front suspension fork of claim 2, wherein the upper end portion of each upper fork tube comprises a removable cap, at least a portion of the biasing member being disposed within the cap.

4. The front suspension fork of claim 1, additionally comprising a bumper within each fork leg and being supported by the lower fork tubes, the bumper being configured to prevent direct contact between the upper fork tubes and the lower fork tubes upon full compression of the suspension fork, wherein at least a portion of the bumper is disposed within the upper end portion of the upper fork tube upon full compression of the suspension fork.

5. The front suspension fork of claim 1, wherein the lower fork tubes are received within the upper fork tubes.

6. A front suspension fork assembly for a vehicle, the suspension fork configured for attachment to a steering tube of the vehicle at an upper end and for supporting a front wheel of the vehicle at a lower end, the suspension fork comprising a pair of fork legs, each fork leg including an upper fork tube and a lower fork tube, the upper fork tubes being telescopingly engaged with the lower fork tubes, a support bridge interconnecting the upper fork tubes, the support bridge and the upper fork tubes being monolithically formed, the support bridge comprising a central portion surrounding the steering tube and an intermediate portion extending between the central portion and each upper fork tube, an upper surface of the intermediate portion being substantially normal to an axis of the fork tube.

7. The front suspension fork of claim 6, wherein each upper fork tube comprises an upper end portion extending above the upper surface of the intermediate portion of the support bridge.

8. The front suspension fork of claim 7, additionally comprising a biasing member within each fork leg, the biasing member being configured to produce a force tending to bias the upper fork tube and the lower fork tube apart from one another, at least a portion of the biasing member being disposed in a space defined by the upper end portion of the upper fork tube.

9. The front suspension fork of claim 8, wherein the upper end portion of each upper fork tube comprises a removable cap, at least a portion of the biasing member being disposed within the cap.

10. The front suspension fork of claim 6, additionally comprising a bumper within each fork leg and being supported by the lower fork tubes, the bumper being configured to prevent direct contact between the upper fork tubes and the lower fork tubes upon full compression of the suspension fork, wherein at least a portion of the bumper is disposed within the upper end portion of the upper fork tube upon full compression of the suspension fork.

11. The front suspension fork of claim 6, wherein the lower fork tubes are received within the upper fork tubes.

12. A scooter comprising a front wheel, at least one rear wheel, and a frame, the frame comprising a head tube configured to rotatably support a steering tube, a front suspension fork assembly coupled to the steering tube at an upper end and supporting a front wheel of the vehicle at a lower end, the suspension fork comprising a pair of fork legs, each fork leg including an upper fork tube and a lower fork tube, the upper fork tubes being telescopingly engaged with the lower fork tubes, a support bridge interconnecting the upper fork tubes, the support bridge and the upper fork tubes being monolithically formed, a central portion of the support bridge surrounding the steering tube, an upper end portion of each upper fork tube extending to a height above a height of the central portion of the support bridge.

13. The scooter of claim 12, additionally comprising a biasing member within each fork leg, the biasing member being configured to produce a force tending to bias the upper fork tube and the lower fork tube apart from one another, at least a portion of the biasing member being disposed in a space defined by the upper end portion of the upper fork tube.

14. The scooter of claim 13, wherein the upper end portion of each upper fork tube comprises a removable cap, at least a portion of the biasing member being disposed within the cap.

15. The scooter of claim 12, additionally comprising a bumper within each fork leg and being supported by the lower fork tubes, the bumper being configured to prevent direct contact between the upper fork tubes and the lower fork tubes upon full compression of the suspension fork, wherein at least a portion of the bumper is disposed within the upper end portion of the upper fork tube upon full compression of the suspension fork.

16. The scooter of claim 12, wherein the lower fork tubes are received within the upper fork tubes.

17. A scooter comprising a front wheel, at least one rear wheel, and a frame, the frame comprising a head tube configured to rotatably support a steering tube, a front suspension fork assembly coupled to the steering tube at an upper end and supporting a front wheel of the vehicle at a lower end, the suspension fork comprising a pair of fork legs, each fork leg including an upper fork tube and a lower fork tube, the upper fork tubes being telescopingly engaged with the lower fork tubes, a support bridge interconnecting the upper fork tubes, the support bridge and the upper fork tubes being monolithically formed, the support bridge comprising a central portion surrounding the steering tube and an intermediate portion extending between the central portion and each upper fork tube, an upper surface of the intermediate portion being substantially normal to an axis of the fork tube.

18. The scooter of claim 17, wherein each upper fork tube comprises an upper end portion extending above the upper surface of the intermediate portion of the support bridge.

19. The scooter of claim 18, additionally comprising a biasing member within each fork leg, the biasing member being configured to produce a force tending to bias the upper fork tube and the lower fork tube apart from one another, at least a portion of the biasing member being disposed in a space defined by the upper end portion of the upper fork tube.

20. The scooter of claim 19, wherein the upper end portion of each upper fork tube comprises a removable cap, at least a portion of the biasing member being disposed within the cap.

21. The scooter of claim 17, additionally comprising a bumper within each fork leg and being supported by the lower fork tubes, the bumper being configured to prevent direct contact between the upper fork tubes and the lower fork tubes upon full compression of the suspension fork, wherein at least a portion of the bumper is disposed within the upper end portion of the upper fork tube upon full compression of the suspension fork.

22. The scooter of claim 17, wherein the lower fork tubes are received within the upper fork tubes.

* * * * *